US012330168B2

(12) United States Patent
Haddon

(10) Patent No.: US 12,330,168 B2
(45) Date of Patent: Jun. 17, 2025

(54) NESTABLE HIGHBANKER

(71) Applicant: Cyle Haddon, West Kelowna (CA)

(72) Inventor: Cyle Haddon, West Kelowna (CA)

(73) Assignee: Cyle Haddon, North Vancouver (CA)

( * ) Notice: Subject to any disclaimer, the term of this patent is extended or adjusted under 35 U.S.C. 154(b) by 0 days.

(21) Appl. No.: 18/516,291

(22) Filed: Nov. 21, 2023

(65) Prior Publication Data

US 2024/0082853 A1 Mar. 14, 2024

Related U.S. Application Data

(62) Division of application No. 17/574,103, filed on Jan. 12, 2022, now Pat. No. 11,857,979.

(60) Provisional application No. 63/136,964, filed on Jan. 13, 2021.

(51) Int. Cl.
*B03B 5/26* (2006.01)
*B07B 1/02* (2006.01)
*B07B 1/04* (2006.01)

(52) U.S. Cl.
CPC .................. *B03B 5/26* (2013.01); *B07B 1/02* (2013.01); *B07B 1/04* (2013.01)

(58) Field of Classification Search
CPC ................ B03B 5/26; B07B 1/02; B07B 1/04
See application file for complete search history.

(56) References Cited

U.S. PATENT DOCUMENTS 1,405,433 A 2/1922 Carl
7,438,188 B2 * 10/2008 Stolworthy ............... B03B 5/04 209/427
8,322,536 B2 12/2012 Rieck
8,678,192 B1 * 3/2014 Pung ......................... B03B 5/26 209/44
2010/0193406 A1 8/2010 Alderson et al.
2016/0023219 A1 1/2016 Mundhra

* cited by examiner

*Primary Examiner* — Michael McCullough
*Assistant Examiner* — Kalyanavenkateshware Kumar
(74) *Attorney, Agent, or Firm* — OYEN, WIGGS, GREEN & MUTALA LLP

(57) ABSTRACT

A hopper assembly for accepting placer deposit and water for use with a highbanker includes a hopper and a cover. The hopper includes an intake surface for accepting the placer deposit, a hopper periphery portion extending along a periphery of the hopper, a water intake, and a window configured to allow the placer deposit and water to exit from the hopper. The water intake accepts water and is located within the hopper periphery portion. The cover includes a cover surface and a plurality of cover openings. The cover surface fits over the hopper periphery portion. The cover openings are formed on the cover surface. The cover surface and the hopper periphery portion define, at least in part, a hollow within which water from the water intake flows. The cover openings allow for water to exit the hollow and contact the placer deposit on the intake surface.

6 Claims, 14 Drawing Sheets

Fig. 20
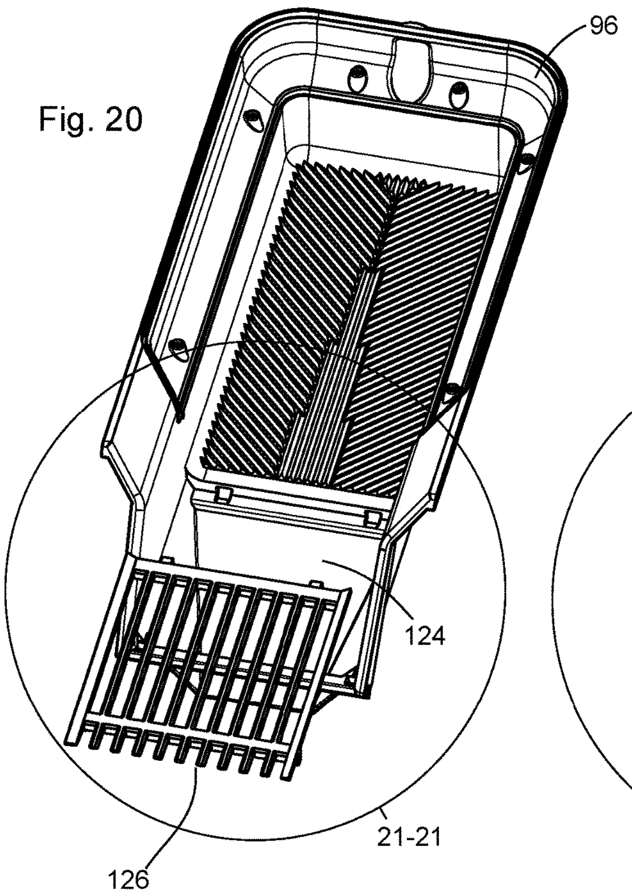
Fig. 22
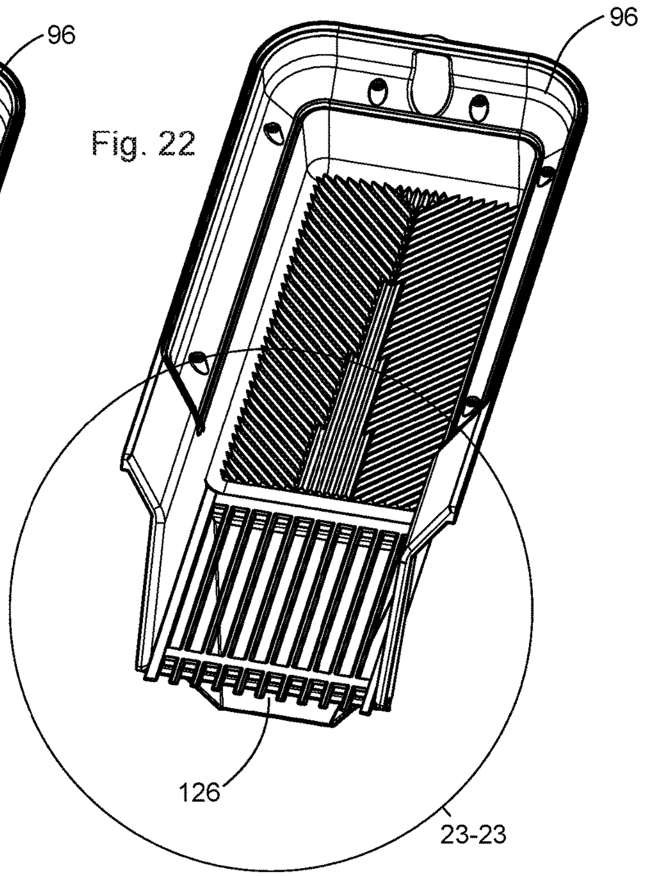
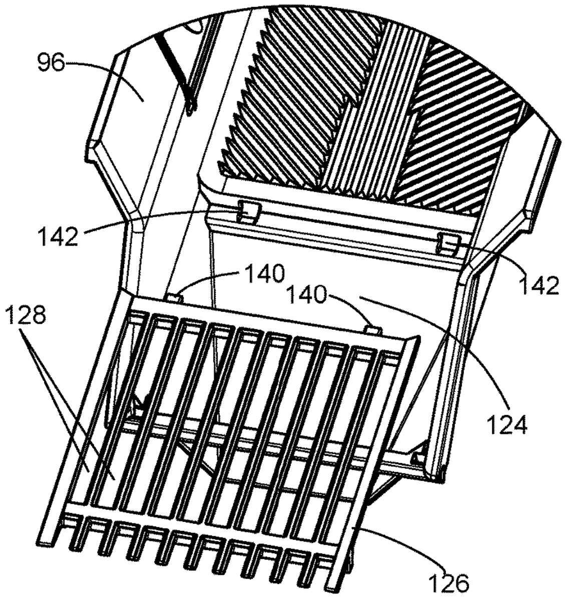
Fig. 21
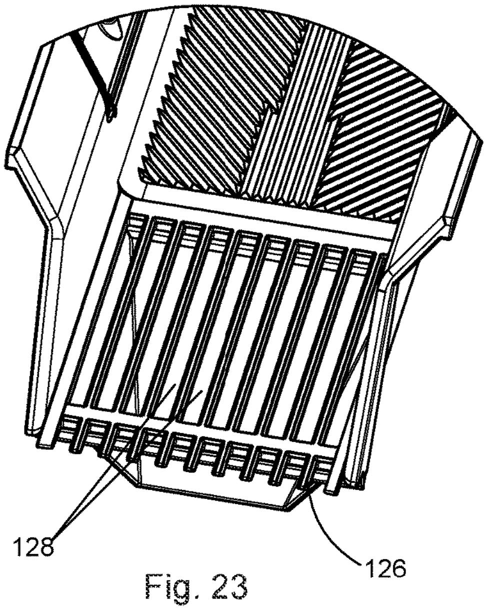
Fig. 23

NESTABLE HIGHBANKER

CROSS-REFERENCE TO RELATED APPLICATIONS

This application is a divisional of U.S. patent application Ser. No. 17/574,103 filed Jan. 12, 2022, which claims the benefit of U.S. Provisional Patent Application No. 63/136,964 filed Jan. 13, 2021, the contents of all of which are hereby incorporated by reference.

FIELD OF THE INVENTION

The invention relates to apparatus used in precious metal prospecting, and in particular, to power sluices or highbankers.

BACKGROUND OF THE INVENTION

Power sluices (also known as highbankers) are commonly used in precious metal prospecting, such as gold prospecting. A typical highbanker comprises an open rectangular box (or a sluice box) with a generally planar surface that is elevated at one end. Riffles, or small obstructions, are formed on the planar surface of the sluice box. Placer deposit (potentially containing precious metals) is introduced to a hopper situated above the sluice box proximate to the elevated end, with the hopper having openings to allow for material to pass through the hopper and onto the surface of the sluice box. Water is also introduced into the hopper through a pump. The water and placer deposit mixture flow into the sluice box and across the planar surface, with the riffles on the planar surface trapping heavier particles (such as precious metals) present in the placer deposit. The trapped material can then be later removed from the riffles to assess for the presence of and to recover any precious metal particles.

Conventional highbankers can be very long in length, making their transport and storage difficult and cumbersome. It is therefore desirable to have an improved highbanker that can be more easily disassembled for transport and storage.

These and other objects will be better understood by reference to this application as a whole. Not all of the objects are necessarily met by all embodiments of the invention described below.

SUMMARY OF THE INVENTION

In one aspect of the invention, a highbanker may be used with sluice mats to separate heavier metals from placer deposit using water. The highbanker comprises a hopper assembly, a trough assembly, a brace member, and a plurality of legs. The hopper assembly accepts placer deposit and water. The trough assembly receives the placer deposit and water from the hopper assembly and comprises first and second trough sections. The first trough section comprises a first surface, and the first trough section is pivotably connected to the hopper assembly. The second trough section comprises a second surface, with the second trough section being removably attachable to the first trough section. The brace member extends between the trough assembly and the hopper assembly. The plurality of legs is removably attachable to the trough assembly. The highbanker may be arranged in an assembled configuration or a nested configuration. In the assembled configuration, the second trough section is attached to the first trough section so that the first surface and the second surface define a substantially continuous surface for accepting the sluice mats. In the nested configuration, the second trough section is nested within the first trough section.

In another aspect, the brace member is removably attachable to the trough assembly and the hopper assembly.

In yet another aspect, the brace member comprises a brace end, and the hopper assembly comprises a series of ridges configured to engage with the brace end. An angle between the hopper assembly and the trough assembly is selected by selectively engaging the brace end with particular ones of the ridges.

In still yet another aspect, the first trough section comprises opposed first walls extending from the first surface, and the second trough section comprises opposed second walls extending from the second surface.

In still a further aspect, the brace member comprises two brace arms, with the brace arms being pivotably connected to the first walls.

In another aspect, the first walls comprise first wall openings, and the brace arms comprise pins. The pins are configured to engage with the first wall openings in both the assembled configuration and the nested configuration.

In still another aspect, the second walls comprise outward protrusions, and the first walls comprise slots. The outward protrusions are configured to engage with the slots in both the assembled configuration and the nested configuration.

In a further aspect, the second walls comprise grooves, and the grooves are configured to engage with the pins in the assembled configuration.

In still a further aspect, the highbanker further comprises brackets for removable attaching the legs to the trough assembly.

In still yet a further aspect, the brackets are configured to allow for selecting an angle between each of the legs and the trough assembly.

In another aspect of the invention, a hopper assembly is provided for accepting placer deposit and water for use with a highbanker. The hopper assembly comprises a hopper and a cover. The hopper comprises an intake surface for accepting the placer deposit, a hopper periphery portion extending along a periphery of the hopper, a water intake, and a window configured to allow the placer deposit and water to exit from the hopper. The water intake is configured to accept water and is located within the hopper periphery portion. The cover comprises a cover surface and a plurality of cover openings. The cover surface is configured to fit over the hopper periphery portion. The cover openings are formed on the cover surface. The cover surface and the hopper periphery portion define, at least in part, a hollow within which water from the water intake flows. The cover openings are configured to allow for water to exit the hollow and contact the placer deposit on the intake surface.

In still another aspect, the cover openings are configured to allow for streams of water to exit the hollow and contact the placer deposit on the intake surface.

In a further aspect, the hopper periphery portion is located on an upper periphery of the hopper.

In still a further aspect, the hopper assembly further comprises a screen removably attachable over the window.

In still yet a further aspect, the screen comprises a plurality of screen openings for allowing particular sizes and shapes of placer deposit to pass through the screen.

In another aspect, a highbanker comprises a hopper assembly, a trough assembly, a brace member, and a plurality of legs. The trough assembly is pivotably connected to the hopper assembly. The trough assembly comprises first and second trough sections. The brace member extends between the trough assembly and the hopper assembly. The plurality of legs is removably attachable to the trough assembly. The second trough section is configured to connect to the first trough section in an assembled configuration and is configured to nest within the first trough section in a nested configuration. The brace member is configured to angle the hopper assembly with respect to the trough assembly in the assembled configuration and is configured to be placed on the second trough section in the nested configuration. The legs are configured to be attached to the trough assembly to elevate the trough assembly in the assembled configuration and are configured to be removed and placed within the second trough section in the nested configuration.

The foregoing was intended as a summary only and of only some of the aspects of the invention. It was not intended to define the limits or requirements of the invention. Other aspects of the invention will be appreciated by reference to the detailed description of the embodiments.

BRIEF DESCRIPTION OF THE DRAWINGS

The preferred embodiment of the invention will be described by reference to the drawings thereof, in which:

FIG. 20 is a top perspective view of the hopper assembly with the screen detached;

FIG. 21 is a magnified view of the portion 21-21 of FIG. 20;

FIG. 22 is a top perspective view of the hopper assembly with the screen attached;

FIG. 23 is a magnified view of the portion 23-23 of FIG. 22;

DETAILED DESCRIPTION OF THE INVENTION

Figure 1:
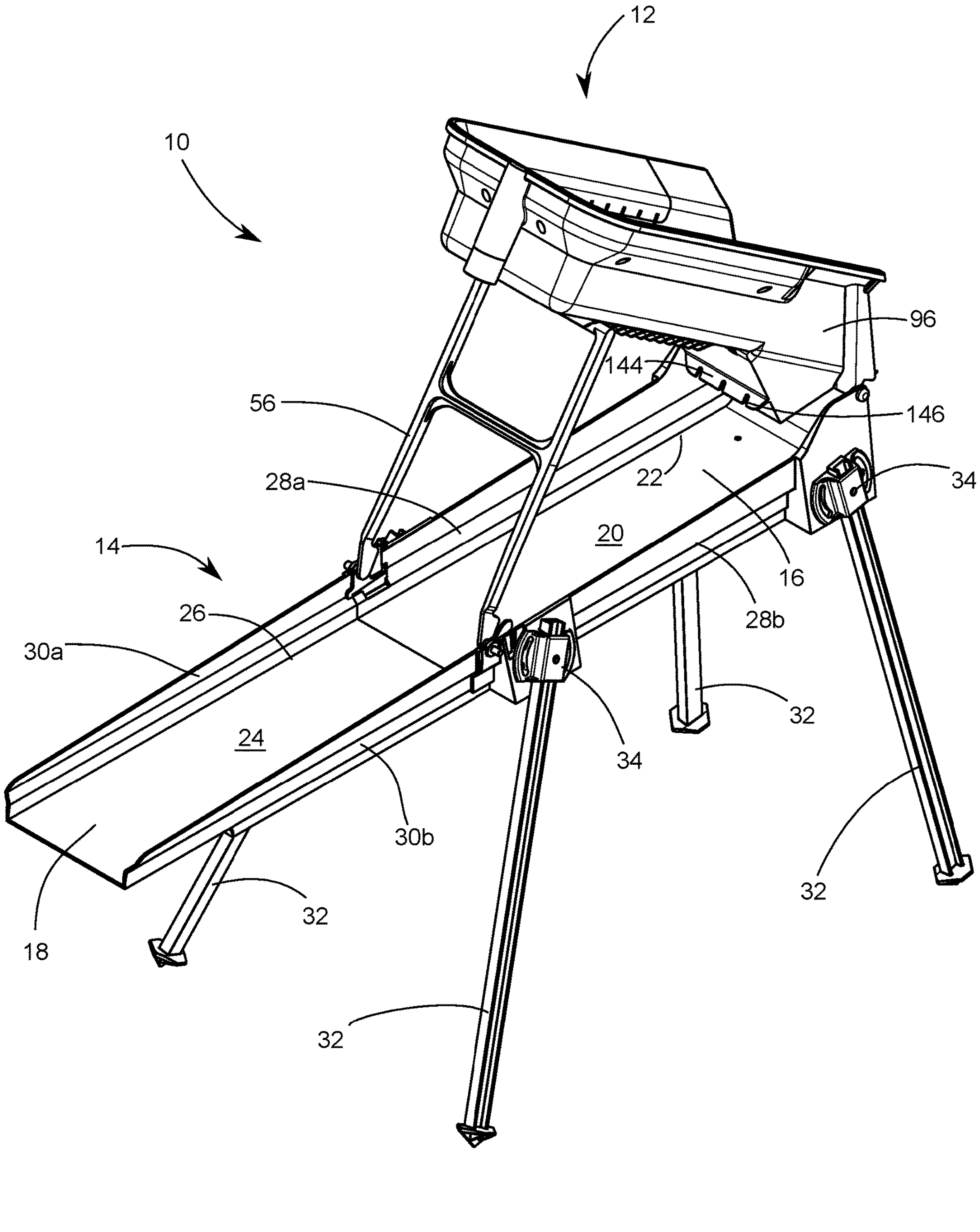
FIG. 1 is a perspective view of a highbanker in accordance with the invention.

Referring to FIGS. 1 to 4, a highbanker 10 in accordance with the present invention comprises an upper hopper assembly 12 and a lower trough assembly 14. The hopper assembly 12 is configured to accept placer deposit and water for feeding to the trough assembly 14. The trough assembly 14 comprises first and second trough sections 16, 18 that are removably detachable from each other.

The first trough section 16 comprises a first surface 20 with first lateral edges 22, while the second trough section 18 comprises a second surface 24 with second lateral edges 26. Preferably, the first surface 20 and the second surface 24 are substantially co-planar with each other and generally define a substantially continuous surface on which one or more sluice mats 27 may be placed thereon. Alternatively, riffles may be formed on one or both of the first and second surfaces 20, 24 so that the use of separate sluice mats 27 are not required. The sluice mats 27 separate heavier metals from the placer deposit and water as the placer deposit and water move along.

The first trough section 16 comprises a pair of opposed first walls 28*a*, 28*b* extending from the first lateral edges 22. The second trough section 18 comprises a pair of opposed second walls 30*a*, 30*b* extending from the second lateral edges 26. Preferably, the first wall 28*a* and the second wall 30*a* are substantially continuous with each other, and the first wall 28*b* and the second wall 30*b* are substantially continuous with each other. This acts to prevent material (e.g. placer deposit) from escaping between the first wall 28*a* and the second wall 30*a* and between the first wall 28*b* and the second wall 30*b*.

The highbanker 10 further comprises a plurality of legs 32 that are removably connected to the trough assembly 14 and are used to elevate the trough assembly 14 above the ground. In the embodiment shown in FIGS. 1 to 4, four of the legs 32 are provided, with the legs 32 removably connected to the first trough section 16. However, it is understood that a greater or fewer number of the legs 32 may be provided, and the legs 32 may be removably connected to one or both of the first and second trough sections 16, 18.

Figure 2:
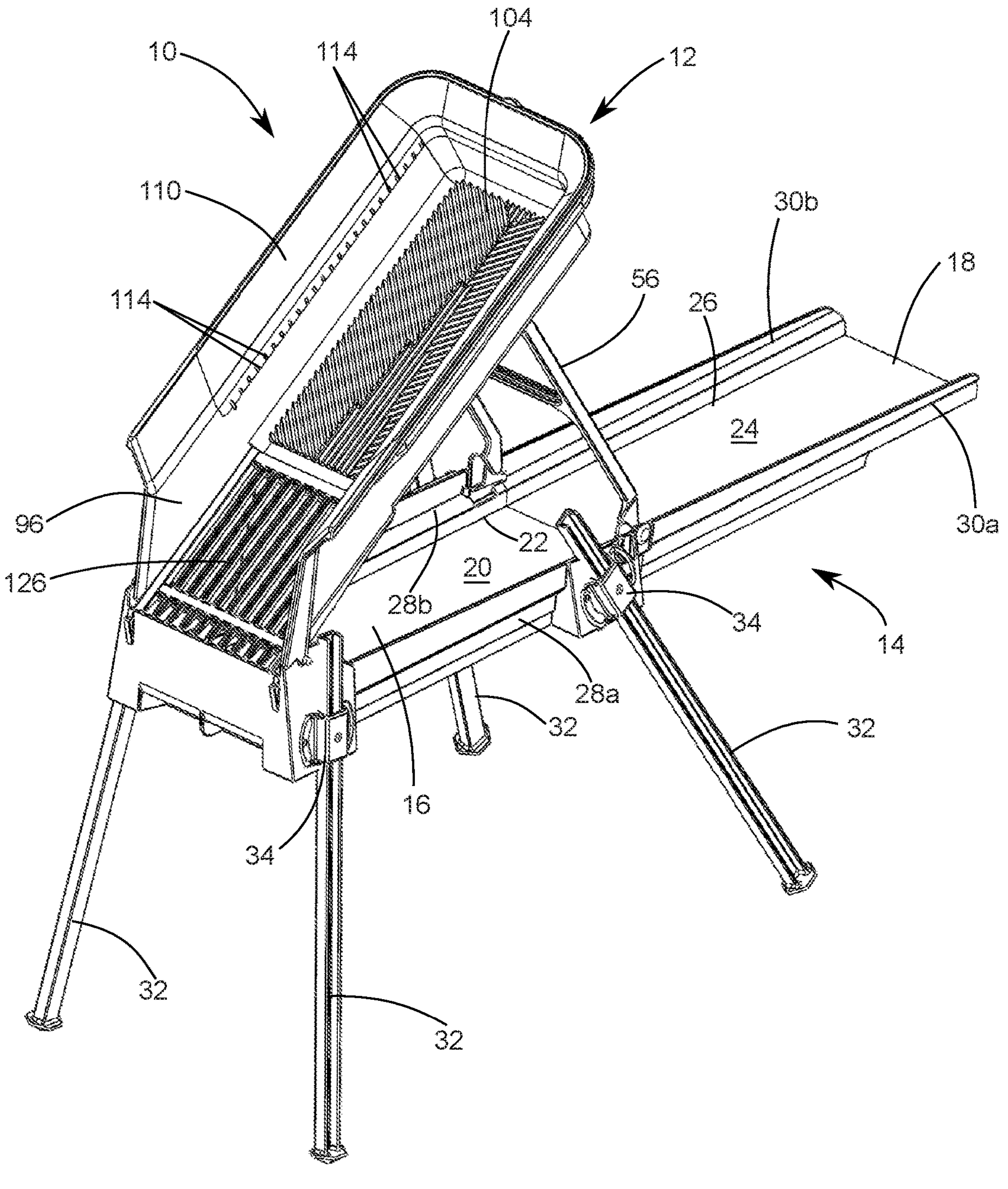
FIG. 2 is another perspective view of the highbanker.

Referring to FIGS. 1 and 2, the legs 32 may be connected to first or second trough sections 16, 18 using brackets 34. For example, in the embodiment shown in FIGS. 1 to 4, where the legs 32 are removably connected to the first trough section 16, the first walls 28*a*, 28*b* comprise attachment surfaces 36 that are configured to receive the legs 32 and the brackets 34 (best seen in FIG. 5). The attachment surfaces 36 may be substantially planar and comprise one or more attachment surface openings 38.

The brackets 34 may comprise a central bracket portion 40 that is generally U-shaped, along with bracket flanges 42 extending from the central bracket portion 40. The central bracket portion 40 is configured to engage with one of the legs 32. The bracket flanges 42 comprise bracket openings 44. The attachment surface openings 38 and the bracket openings 44 are configured to receive bracket fasteners 46 therethrough to secure one of the brackets 34 to one of the attachment surfaces 36. In particular, when the bracket flanges 42 are secured to one of the attachment surfaces 36, a portion of the leg 32 is held substantially flush against the attachment surface 36. The central bracket portion 40 may comprise one or more central bracket openings 48 configured to accept leg fasteners 50. The leg fasteners 50 may be screws that are threadedly engaged through the central bracket openings 48 and against the leg 32 in order to secure the leg 32 in place.

The attachment surfaces 36 may be angled (with respect to a vertical plane) such that when the brackets 34 and the legs 32 are attached thereto, the legs 32 are splayed outwards. This acts to increase the stability and strength of the highbanker 10 when in use. Furthermore, depending on where along the legs 32 the brackets 34 engage, a height and an angle of the first trough section 16 (and consequently the first surface 20) may be selected. In another embodiment, the bracket openings 44 may be elongated and forming an arc, such that the bracket 34 may be secured to the attachment surface 36 at different rotational angles. This also allows for the angle of the first trough section 16 to be differentially selected.

Figure 3:
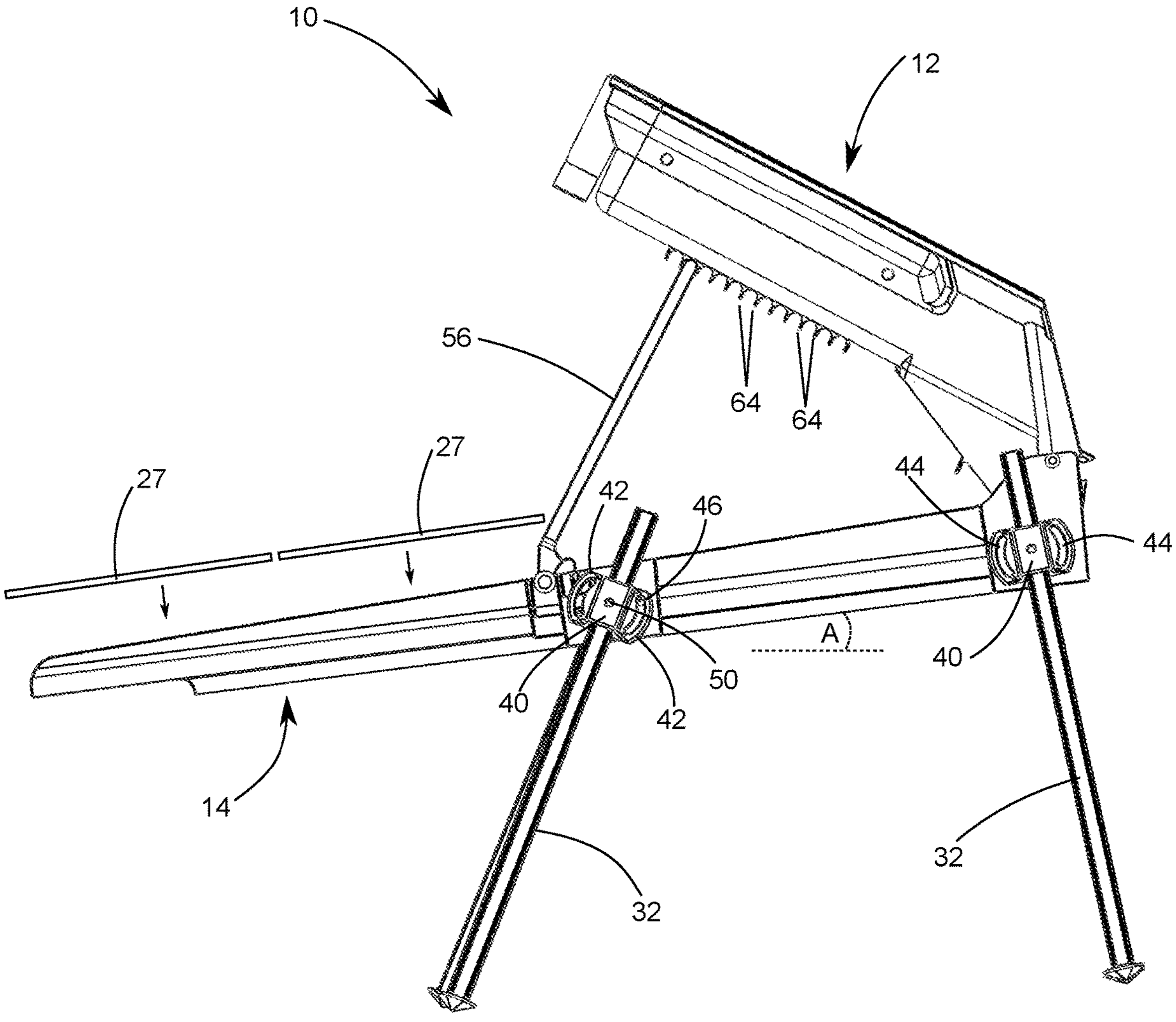
FIG. 3 is a side view of the highbanker.

As described earlier, the first surface 20 and the second surface 24 preferably define a substantially continuous surface. As such, if the first surface 20 is angled (i.e. with respect to the vertical or horizontal), the second surface 24 will be similarly angled. For example, when the highbanker 10 is in use, the first surface 20 (and consequently the second surface 24) may be angled at an angle A with respect to the horizontal plane (as shown in FIG. 3). This angling of the first surface 20 and the second surface 24 promotes the movement of placer deposit and water from the first trough section 16 to the second trough section 18.

The first trough section 16 comprises a first upper end 52 and a first lower end 54. In the embodiment shown in FIGS. 1 to 4, two of the legs 32 extend from the first trough section 16 proximate to the first upper end 52, and two of the legs 32 extend from the first trough section 16 proximate to the first lower end 54.

Referring to FIGS. 5 to 8, the hopper assembly 12 is pivotably connected to the trough assembly 14, preferably proximate to the first upper end 52. The highbanker 10 comprises a brace member 56 that extends between the trough assembly 14 and the hopper assembly 12. The brace member 56 comprises a brace end 58 and two brace arms 60 extending from the brace end 58. The brace end 58 is connected to the hopper assembly 12, while the brace arms 60 are connected to the trough assembly 14.

Figure 5:
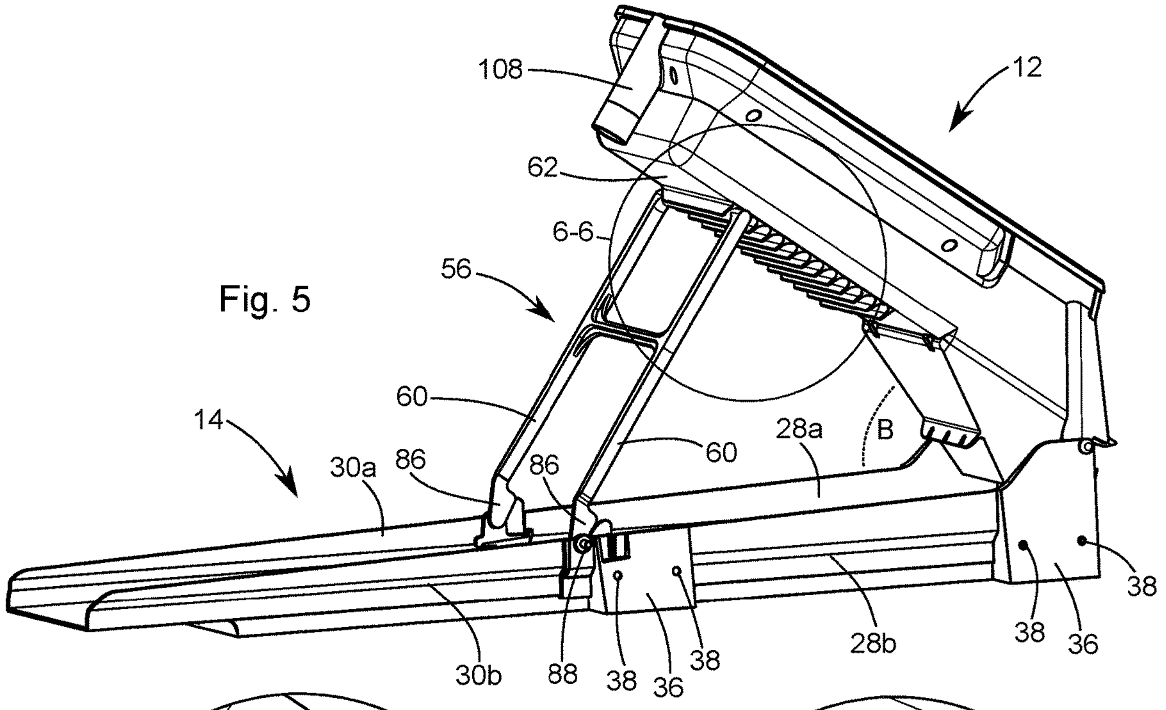
FIG. 5 is a partial view of the highbanker.
Figure 6:
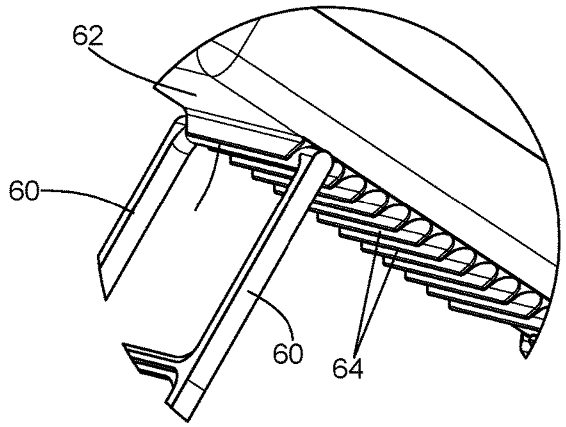
FIG. 6 is a magnified view of the portion 6-6 in FIG. 5.
Figure 8:
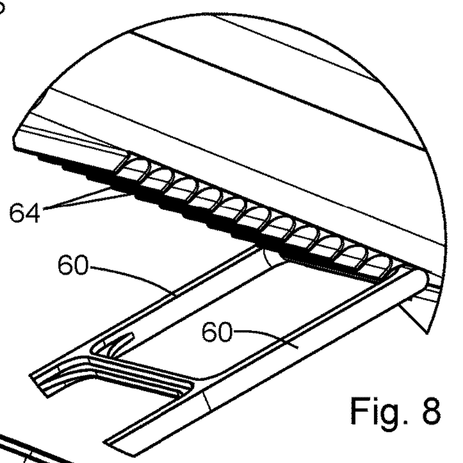
FIG. 8 is a magnified view of the portion 8-8 in FIG. 7.
Figure 7:
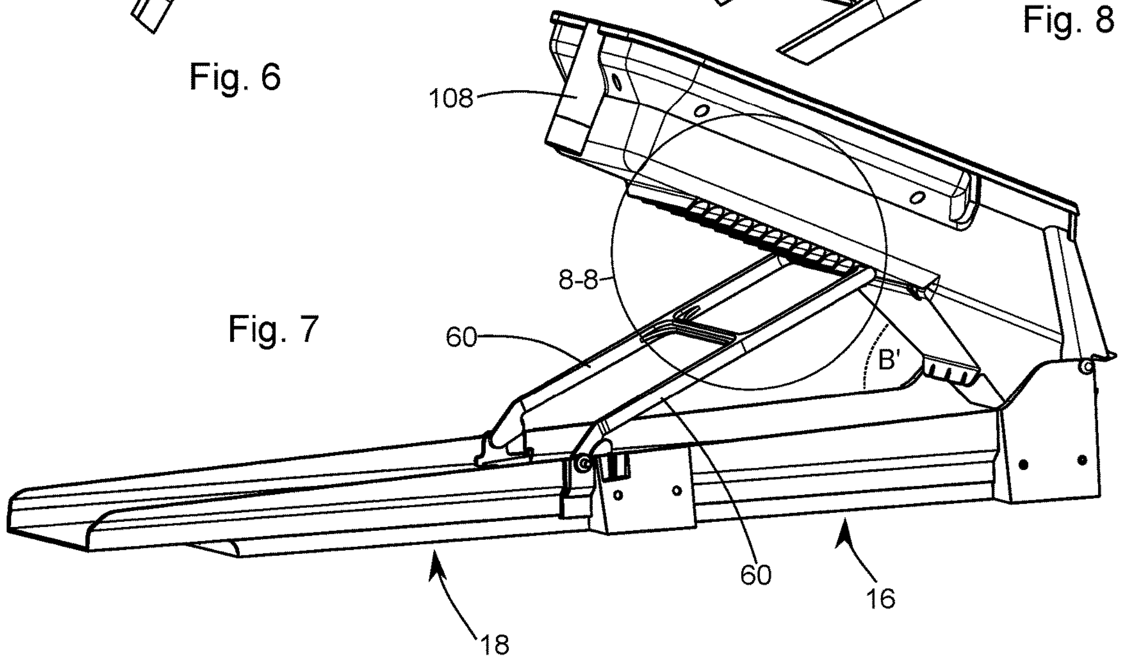
FIG. 7 is another partial view of the highbanker.

The hopper assembly 12 comprises a hopper lower surface 62. A series of ridges 64 is formed on the hopper lower surface 62. The brace end 58 is configured to detachably engage with adjacent ones of the ridges 64, as shown in FIGS. 6 and 8. For example, the brace end 58 may be configured such that it is able to fit in between adjacent ones of the ridges 64. By selecting the particular ones of the ridges 64 with which to engage the brace end 58, a relative angle of the hopper assembly 12 with respect to the trough assembly 14 may be adjusted. For example, FIGS. 5 to 8 show two different possible angles (B, B') for the hopper assembly 12 and the trough assembly 14, depending on where along the ridges 64 the brace end 58 is engaged.

Referring to FIGS. 9 to 12, the second trough section 18 may be removably attached and detached from the first trough section 16. The second trough section 18 comprises a second upper end 66 and a second lower end 68. The second trough section 18 also comprises engagement portions 70 extending from each of the second walls 30*a*, 30*b* proximate to the second upper end 66. The engagement portions 70 comprise outward-facing protrusions 72. The second trough section 18 comprises a lip 73 extending from the second surface 24. The lip 73 may be generally U-shaped, with the lip 73 extending along at least a portion of the second walls 30*a*, 30*b*. Because the lip 73 extends along a portion of the second walls 30*a*, 30*b*, a gap 75 is present between each of the engagement portions 70 and the lip 73.

Figure 9:
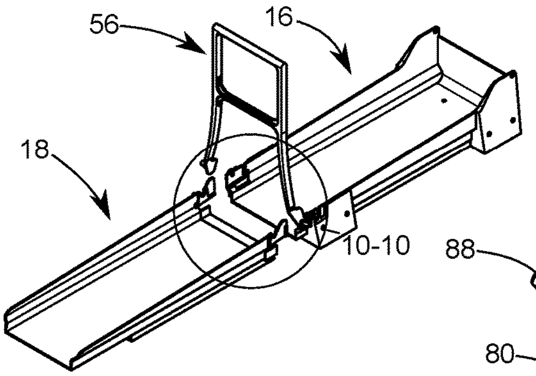
FIG. 9 is a partial view of the highbanker before the second trough section is connected to the first trough section.
Figure 10:
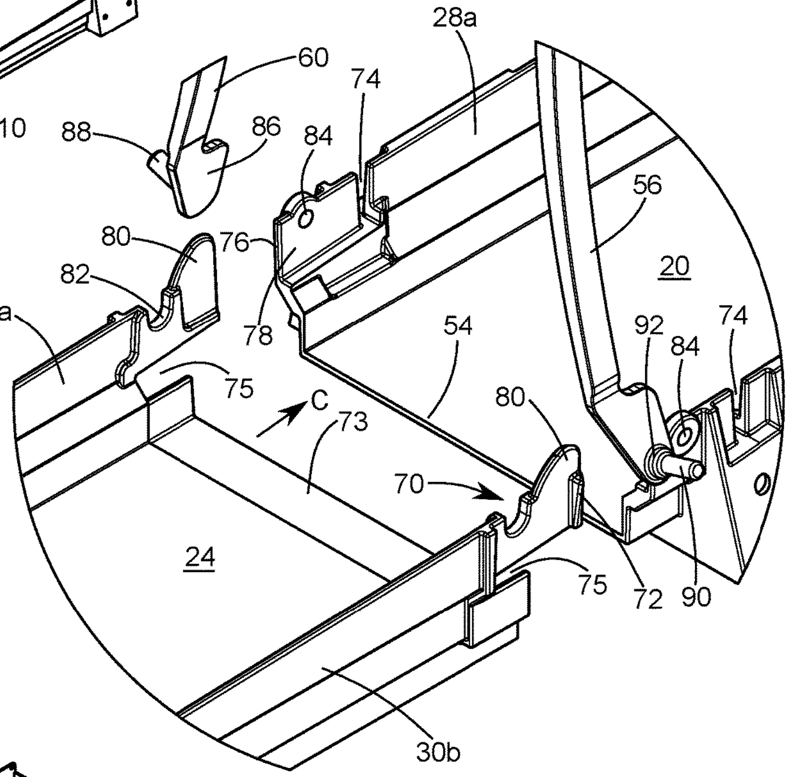
FIG. 10 is a magnified view of the portion 10-10 in FIG. 9.
Figure 11:
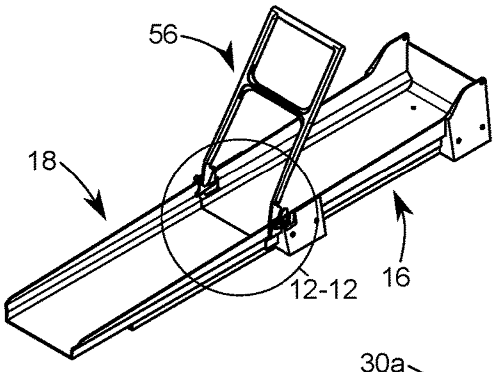
FIG. 11 is a partial view of the highbanker after the second trough section is connected to the first trough section.
Figure 12:
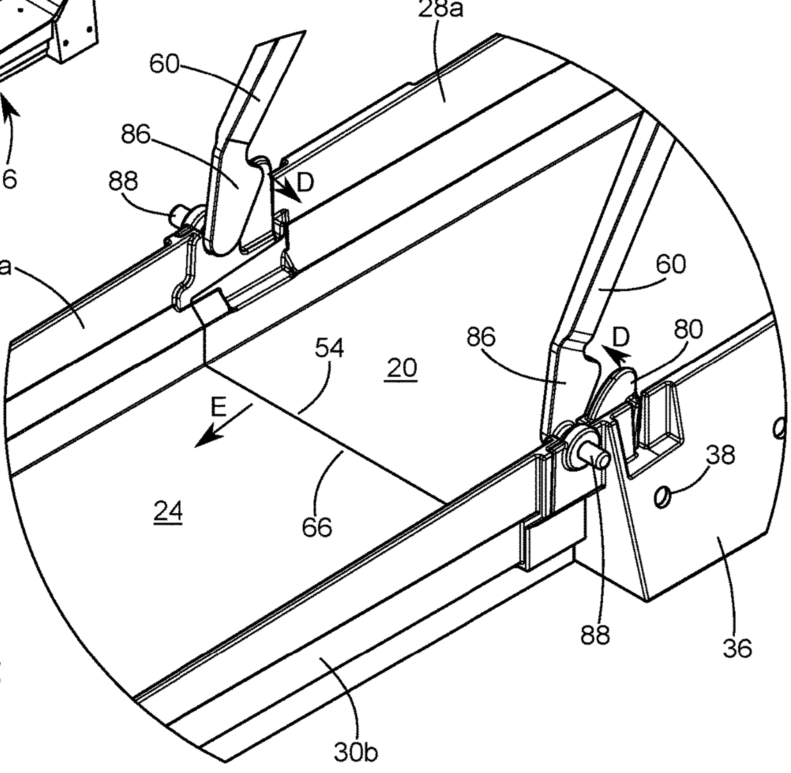
FIG. 12 is a magnified view of the portion 12-12 in FIG. 11.

Each of the first walls 28*a*, 28*b* comprises a slot 74 proximate to the first lower end 54. The slots 74 are configured to removably engage with the protrusions 72 when the second trough section 18 is connected to the first trough section 16. Referring to FIGS. 9 and 10, in order to connect the second trough section 18 to the first trough section, the second trough section 18 is first placed close to the first trough section 16. The second trough section 18 may then be moved towards the first trough section 16 in direction C (as shown in FIG. 10). The protrusions 48 will come into contact with a leading edge 76 on the first walls 28*a*, 28*b*. The protrusions 72 are preferably bevelled such that further movement of the second trough section 18 in the direction C will cause causing the engagement portions 70 to deflect inwards. Continual movement of the second trough section 18 in direction C will cause the protrusions 72 to slide along an inner surface 78 of the first walls 28*a*, 28*b*, with the engagement portions 70 still being deflected inwards. When the protrusions 72 reach the slots 74, the protrusions 72 will engage into the slots 74, and the engagement portions 70 will no longer be deflected inwards. The engagement of the protrusions 72 into the slots 74 secures the second trough section 18 in place with respect to the first trough section 16 (as shown in FIG. 12). In addition, the lip 73 may engage the first surface proximate to the first lower end 54, thereby further helping to secure the second trough section 18 in place with respect to the first trough section 16.

In order to detach the second trough section 18 from the first trough section 16, the engagement portions 70 are first pushed inwards in directions D (as shown in FIG. 12). In order to facilitate this, the engagement portions 70 may comprise tabs 80. The tabs 80 are sized such that they extend beyond the first walls 28*a*, 28*b* when the second trough section 18 is connected to the first trough section 16. The tabs 80 provide a surface on which force may be applied to push the engagement portions 70 inwards. As the tabs 80 are pushed inwards, the protrusions 72 will begin to move out of the slots 74. Once the protrusions 72 have cleared the slots 74, the protrusions 72 may engage with the inner surface 78 of the first walls 28*a*, 28*b*. Movement of the second trough section 18 in direction E (as shown in FIG. 12) will cause the protrusion 72 to move along the inner surface 78 (with the engagement portions 70 being deflected inwards) until the protrusions 72 reach the leading edge 76. At that point, the engagement portions 70 will revert to their original orientation, and the second trough section 18 will be released from the first trough section 16.

Referring to FIG. 10, the engagement portions 70 comprise a semicircular groove 82 configured to pivotably engage with the brace arms 60. Furthermore, the first walls 28*a*, 28*b* each comprise a first wall opening 84 that is also configured to pivotably engage with the brace arms 60. The first wall opening 84 is located proximate to the first lower end 54, and preferably, in between the slot 74 and the first lower end 54. The groove 82 and the first wall opening 84 are substantially aligned when the second trough section 18 is connected to the first trough section 16.

Each of the brace arms 60 comprises a wing 86 and a pin 88 extending from the wing 86. When the second trough section 18 is connected to the first trough section 16, the pin 88 is configured to engage with both the first wall opening 84 and the groove 82, as shown in FIG. 12. In particular, the pin 88 is preferably sized so that one portion fits within the first wall opening 84 while another portion rests on the groove 82. For example, in one embodiment, the first wall opening 84 may have a diameter that is less than the diameter of the groove 82. Accordingly, the pin 88 may comprise first and second pin portions 90, 92, with the first pin portion 90 having a smaller diameter than the second pin portion 92. When the pin 88 is engaged with the first wall opening 84 and the groove 82, the first pin portion 90 is sized to fit within the first wall opening 84, while the second pin portion 92 is too large for the first wall opening 84 but is able to rest on the groove 82.

After the second trough section 18 has been connected to the first trough section 16, the brace member 56 may be connected to the trough assembly 14 as follows. The brace arms 60 may be deflected inwards until the first pin portions 90 are able to be inserted through the first wall openings 84 on the first walls 28*a*, 28*b*. This will allow the brace arms 60 to partially revert back to their original orientation, until the first pin portions 90 have been fully inserted through the first wall openings 84. However, the larger diameter of the second pin portion 92 will prevent the second pin portions 92 from passing through the first wall openings 84. Instead, once the second pin portions 92 contact the first wall openings 84, further outward movement of the brace arms 60 is prevented. The second pin portions 92 will rest on the grooves 80 of the second walls 30*a*, 30*b*. Because the brace arms 60 are still under some tension (from the previous inward deflection of the brace arms 60), the brace arms 60 will tend to push outwards, resulting in the wings 86 exerting outward pressure on the second walls 30*a*, 30*b* proximate to the grooves 80. This outward pressure by the brace arms 60 has the effect of securing the second trough section 18 in place to the first trough section 16.

The brace member 56 may be detached from the trough assembly 14 by deflecting the brace arms 60 inward so that the first pin portions 90 move through the first wall openings 84. Once the first pin portions 90 have cleared the first wall openings 84, the brace member 56 may be removed from the trough assembly 14.

Figure 13:
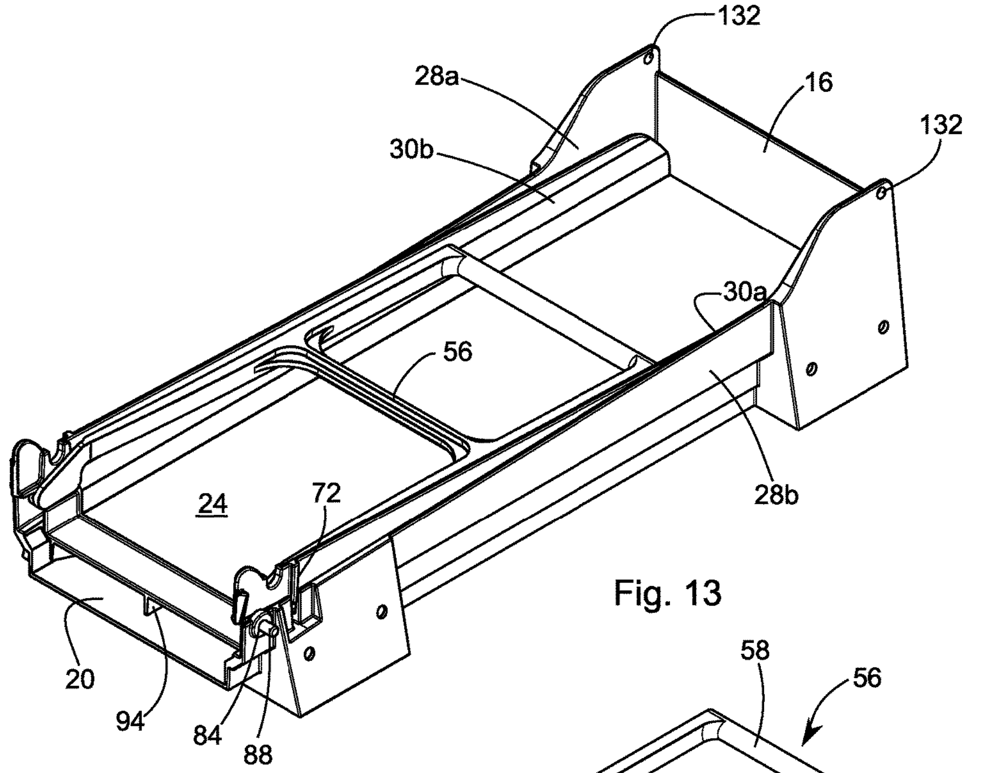
FIG. 13 is a partial view of the highbanker.
Figure 14:
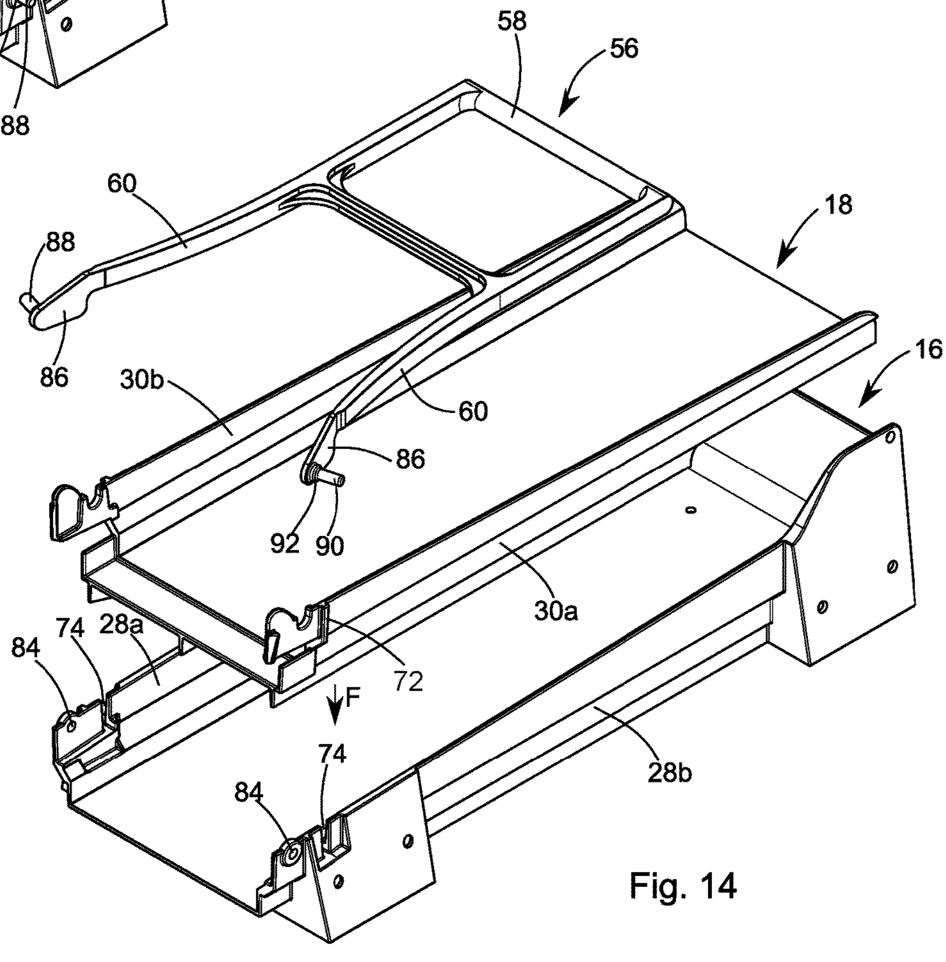
FIG. 14 is an exploded view of FIG. 13.

Referring to FIGS. 13 and 14, after the second trough section 18 has been detached from the first trough section 16, the second trough section 18 may be nested within the first trough section 16 in order to reduce the overall length of the highbanker 10 for storage. To do so, the second trough section 18 may be rotated 180° laterally and placed within the first trough section 16 such that the second wall 30*a* engages with the first wall 28*b* and the second wall 30*b* engages with the first wall 28*a*. In addition, the protrusion 72 on the engagement portion extending from the second wall 30*a* is able to engage, at least partially, with the slot 74 on the first wall 28*b*. Similarly, the protrusion 72 on the engagement portion extending from the second wall 30*b* is able to engage, at least partially, with the slot 74 on the first wall 28*a*. The engagement of the protrusions 72, at least partially, with the slots 74 assist in securing the second trough section 18 within the first trough section 16. The engagement of the protrusions 72 with the slots 74 may be effected by sliding the second trough section 18 down within the first trough section 16 in direction F (as shown in FIG. 14).

Furthermore, when the second trough section 18 has been nested within the first trough section 16, the brace member 56 can be placed over the second trough section 18. Referring to FIG. 13, in one embodiment, after the brace member 56 has been placed on the second trough section 18 with the pins 88 proximate to the engagement portions 70, the brace arms 60 may be deflected inwards until the pins 88 slide past the engagement portions 70 and into the gaps 75. The brace arms 60 can be deflected inwards again until the first pin portions 90 are within the first wall openings 84. The first pin portions 90 are then able to slide through the first wall openings 84 until the second pin portions 92 contact the first wall openings 84, at which time further outward movement of the brace arms 60 is prevented. Because the brace arms 60 are still under some tension (from the previous inward deflection of the brace arms 60), the brace arms 60 will tend to push outwards, resulting in the wings 86 exerting outward pressure on the second walls 30*a*, 30*b* proximate to the gaps 75 and on the engagement portions 70 and the lip 73. This outward pressure by the brace arms 60 has the effect of securing the second trough section 18 in place within the first trough section 16.

Figure 4:
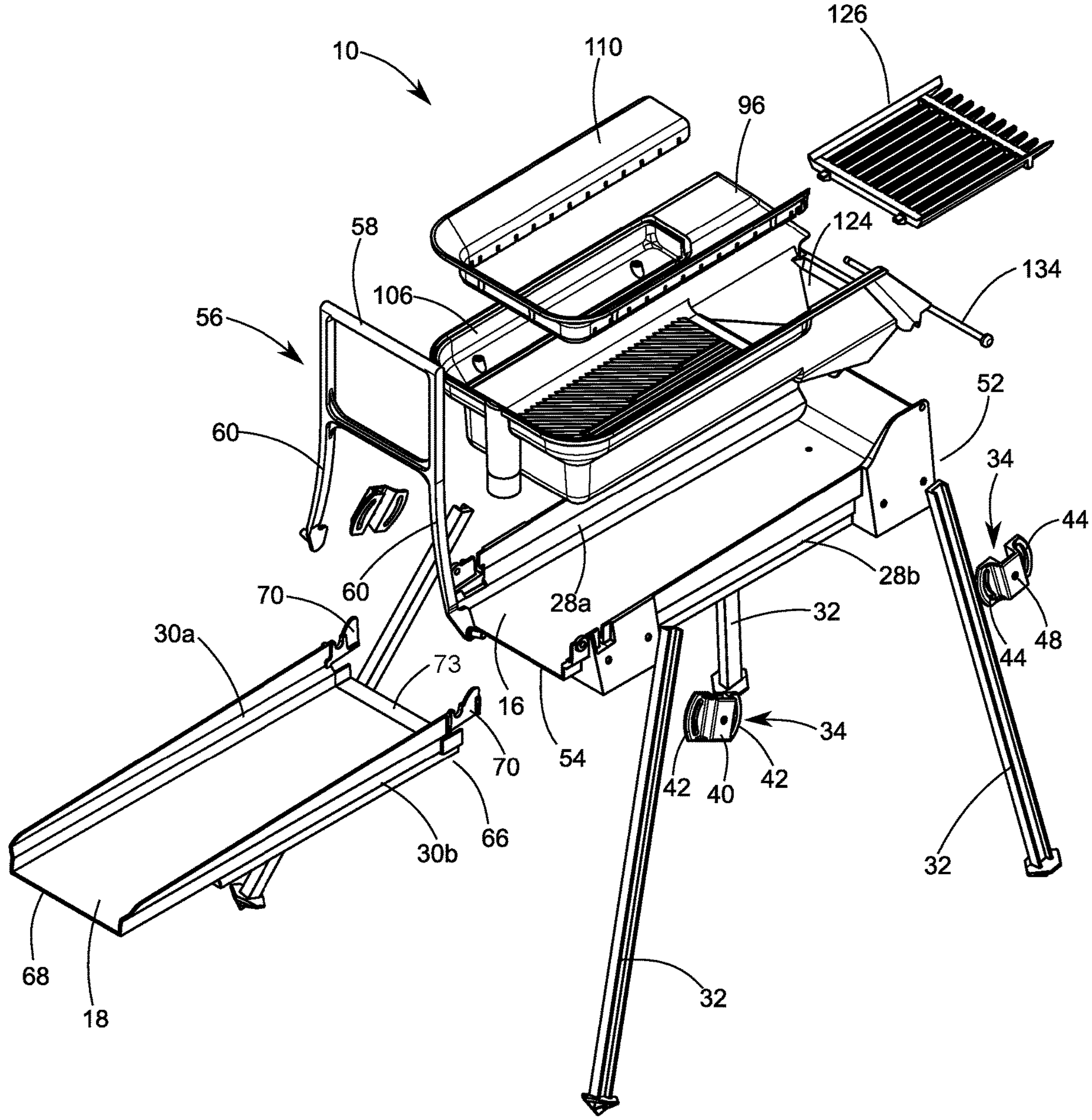
FIG. 4 is an exploded view of the highbanker.

For example, the brace arms 60 are normally splayed slightly outwardly (as best seen in FIG. 4, an exploded view of the highbanker 10). However, when the brace member 56 is attached to the first trough section 16 (using the first wall openings 84), both when the second trough section 18 is connected to the first trough section 16 (as in FIG. 11) and when the second trough section 18 is nested within the first trough section 16 (as in FIG. 13), the brace arms 60 are substantially straight as they are still under some tension.

Figure 15:
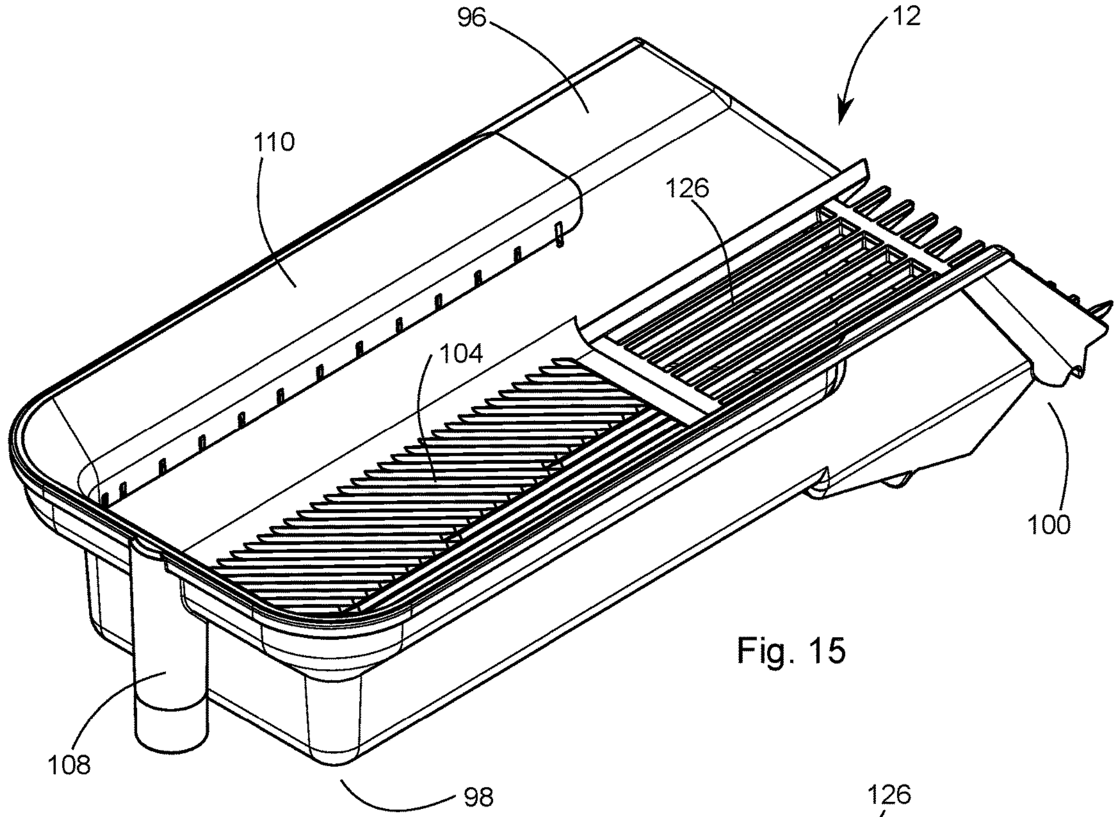
FIG. 15 shows the hopper assembly of the highbanker.
Figure 16:
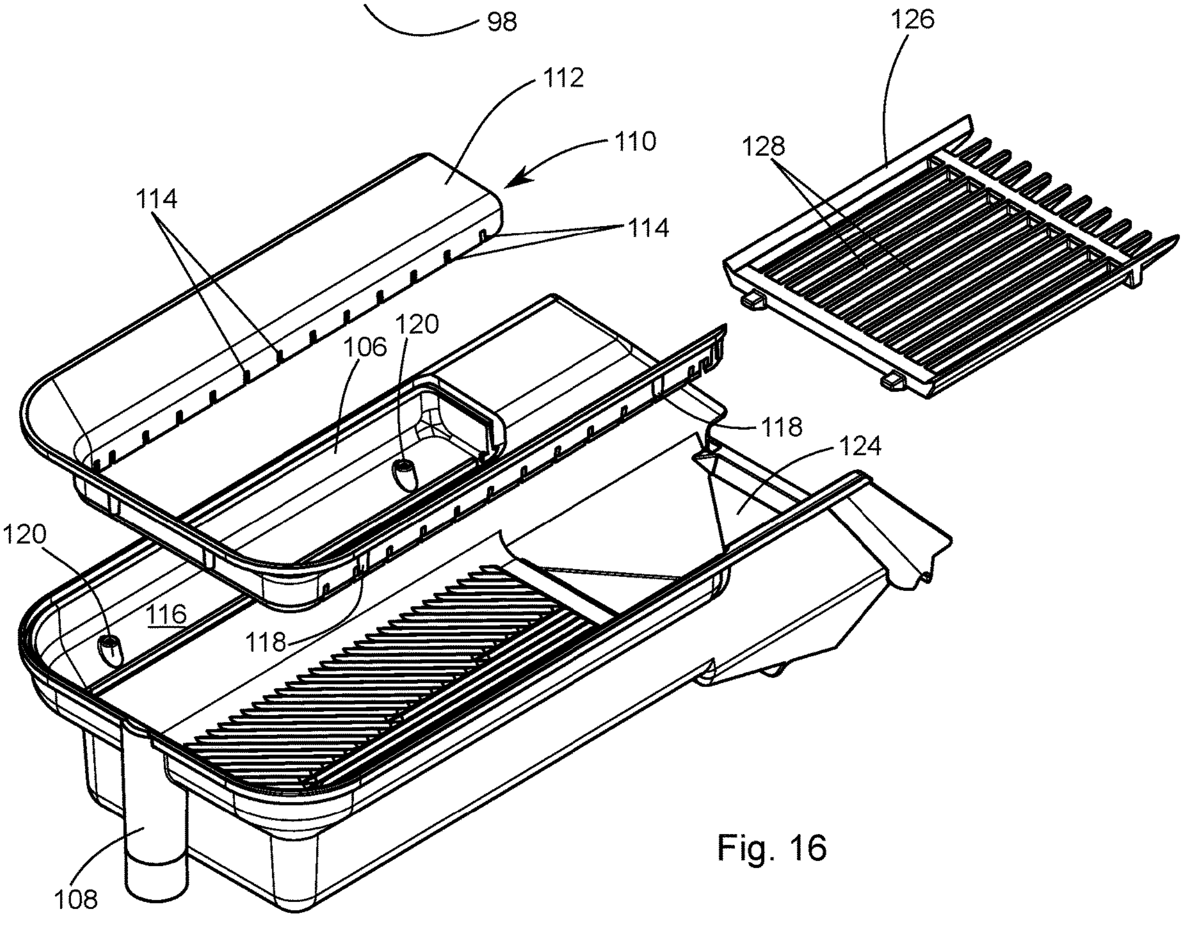
FIG. 16 is an exploded view of the hopper assembly.
Figure 17:
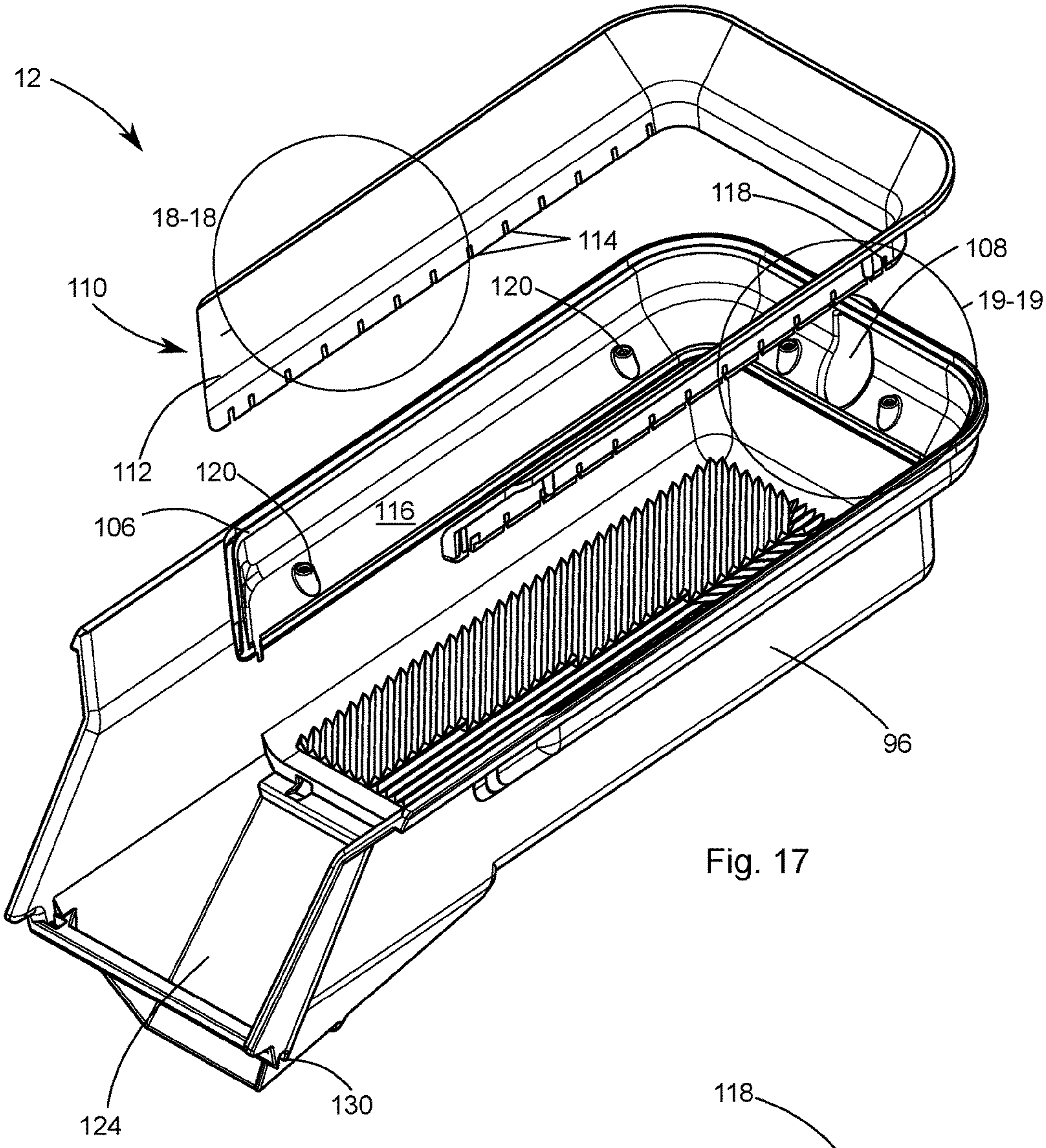
FIG. 17 is another exploded view of the hopper assembly.
Figure 18:
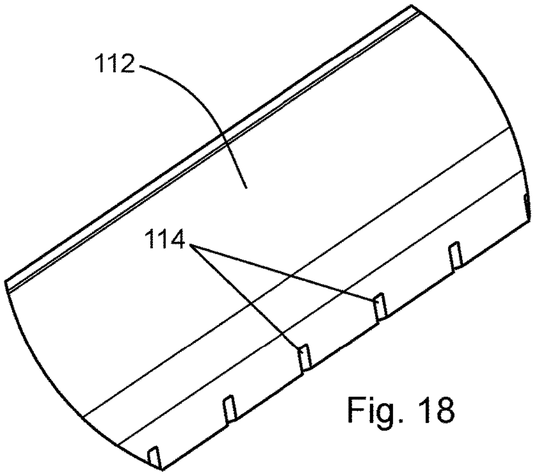
FIG. 18 is a magnified view of the portion 18-18 of FIG. 17.
Figure 19:
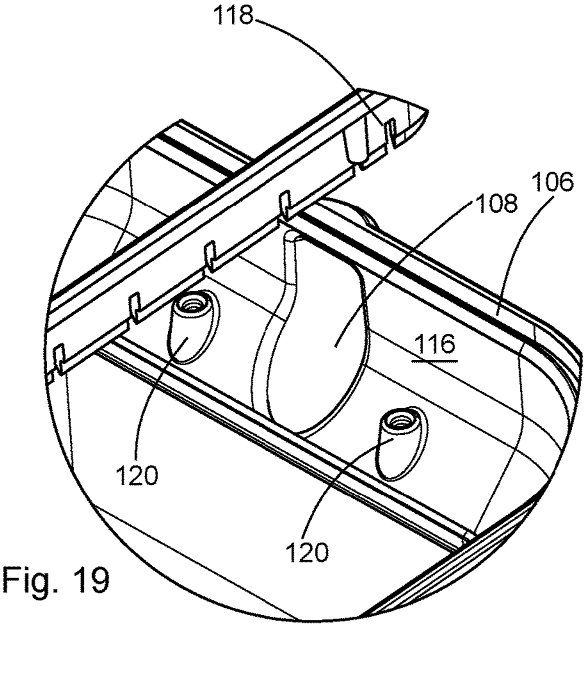
FIG. 19 is a magnified view of the portion 19-19 of FIG. 17.
Figure 24:
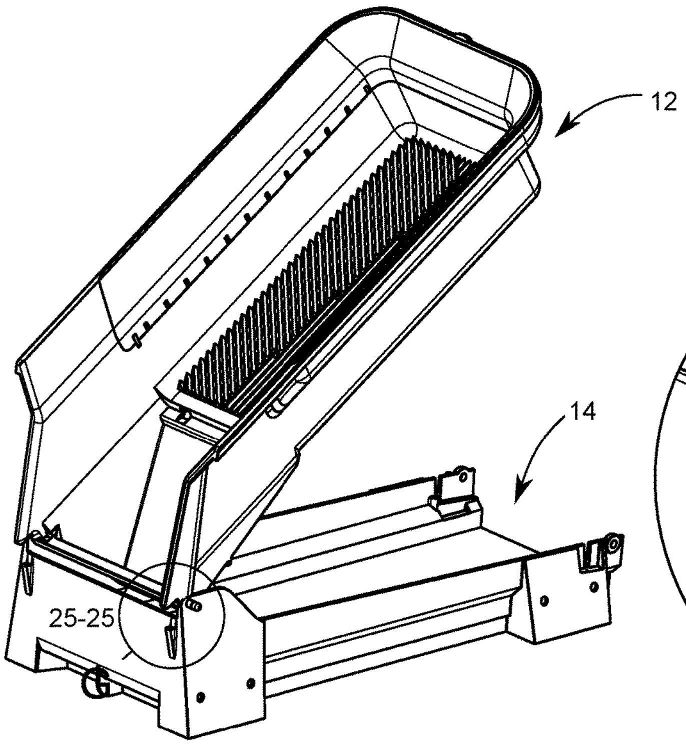
FIG. 24 shows the hopper assembly and the trough assembly in one orientation.

Referring to FIGS. 15 to 23, the hopper assembly 12 comprises a hopper 96 and a cover 110 that is removably attached to the hopper 96. The hopper 96 comprises first and second hopper ends 98, 100 and may be generally rectangular, although other shapes for the hopper 96 are also possible. The hopper 96 comprises an intake surface 104 located towards the first hopper end 98 and on which the placer deposit is loaded. The intake surface 104 is preferably elongated and may comprise a textured or contoured design. The hopper 96 further comprises a hopper periphery portion 106 that extends along a portion of the periphery of the hopper 96. Preferably, the hopper periphery portion 106 may extend along a portion of the upper periphery of the hopper 96. In one embodiment, the hopper periphery portion 106 extends for at least a length of the intake surface 104, although it is also possible for the hopper periphery portion 106 to extend for greater or less than the length of the intake surface 104. Referring to FIGS. 15 and 16, the hopper periphery portion 106 may extend, at least partially, along three of the sides of the intake surface 104.

The hopper 96 further comprises a water intake 108 that is configured to attach to a water supply (such as a hose or the like) and to allow for the water to flow to the hopper periphery portion 106. The water intake 108 is preferably located within the hopper periphery portion 106 proximate to the first hopper end 98; however, it may be located at other locations along the hopper periphery portion 106.

The cover 110 is configured to fit over the hopper periphery portion 106. The cover 110 comprises a cover surface 112 with a plurality of cover openings 114 formed on the cover surface 112. The cover surface 112 preferably does not fit flush against the hopper periphery portion 106; instead, the cover surface 112 and the hopper periphery portion 106 define, at least in part, a hollow 116 within which water from the water intake 108 can flow. Preferably, the hollow 116 extends for almost substantially an entirety of the hopper periphery portion 106, although it may also extend for less than the entirety of the hopper periphery portion 106. In order to define the hollow 116, the cover surface 112 may be contoured such that at least a portion of the cover surface 112 does not contact the hopper periphery portion 106 when the cover 110 is fitted over the hopper periphery portion 106 (as seen in FIG. 16). As water flows through the hollow 116, water may escape from the hollow 116 through the cover openings 114. The water escaping through the cover openings 114 may form streams of water that fall on the placer deposit on the intake surface 104.

In one embodiment, the cover 110 may comprise one or more cover standoffs 118 extending from the cover surface 112. The cover standoffs 118 engage with corresponding hopper standoffs 120 extending from the hopper periphery portion 106. The cover standoffs 118 and the hopper standoffs 120 may be configured to accept cover fasteners 122 for securing the cover 110 to the hopper periphery portion 106. The cover standoffs 118 and the hopper standoffs 120 may also help to space the cover surface 112 apart from the hopper periphery portion 106, thereby helping to define the hollow 116.

The hopper 96 comprises a window 124 located towards the second hopper end 100. The window 124 is configured to allow the placer deposit and water to leave the hopper 96 through the window 124 and fall onto the first trough section 16. When the highbanker 10 is in use, the hopper 96 may be angled (with respect to the horizontal) such that the first hopper end 98 is elevated with respect to the second hopper end 100. As such, the placer deposit loaded onto the intake surface 104, when contacted by the streams of water from the cover openings 114, will tend to move along the intake surface 104 towards the window 124. The textured or contoured design of the intake surface 104 may slow the movement of the placer deposit along the intake surface 104, allowing more time to wash the placer deposit and to direct the placer deposit towards the hopper opening 68.

Referring to FIGS. 20 to 23, the hopper assembly 12 may also comprise a screen 126 that is detachably placed over the window 124. The screen 126 may comprise a plurality of screen openings 128 through which the placer deposit and water from the intake surface 104 may pass through into the first trough section 16. Different ones of the screen 126 (each with different sizes for the screen openings 128) may be interchanged to allow for different sizes and/or shapes of placer deposit to pass through the window 124. Referring to FIG. 21, the screen 126 may comprise one or more protruding fingers 140 that engage with corresponding sockets 142 on the hopper 96 to hold the screen 126 in place.

Figure 25:
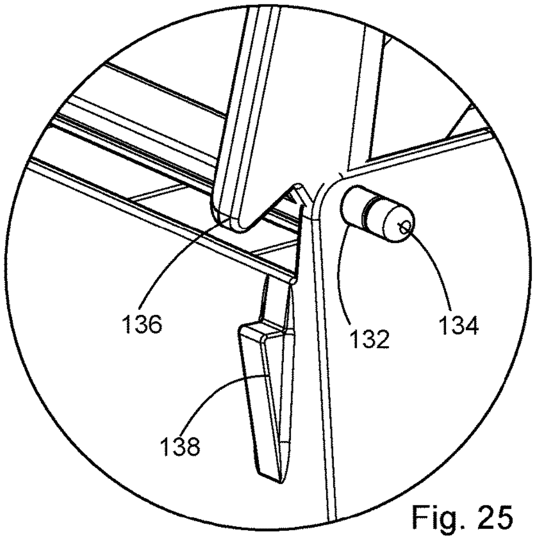
FIG. 25 is a magnified view of the portion 25-25 of FIG. 24.
Figure 26:
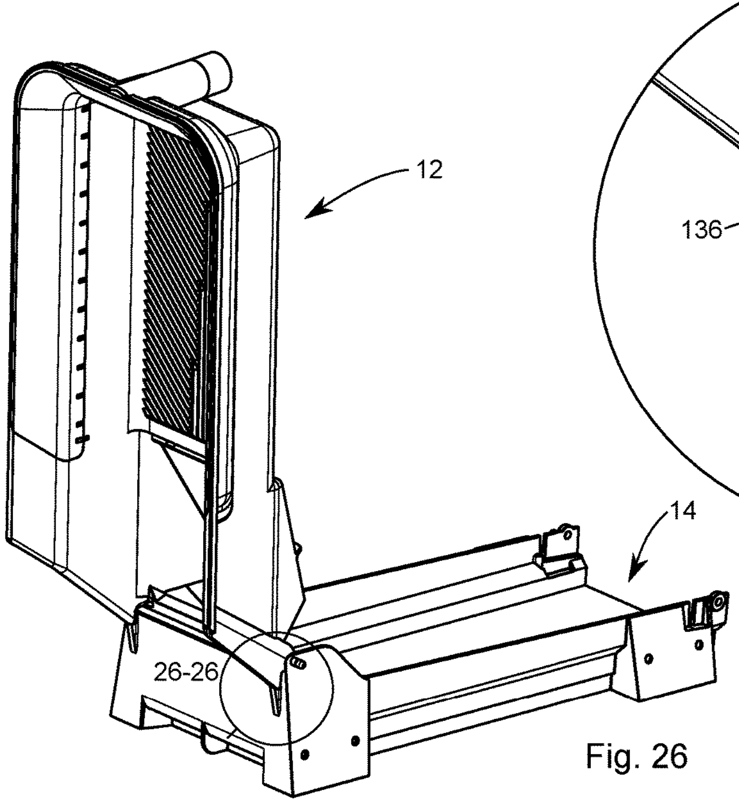
FIG. 26 shows the hopper assembly and the trough assembly in another orientation.
Figure 27:
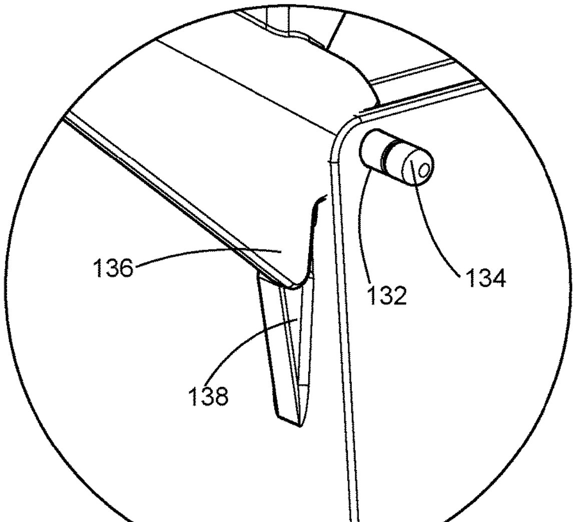
FIG. 27 is a magnified view of the portion 27-27 of FIG. 26.

Referring to FIGS. 24 to 27, the hopper 96 is pivotably connected to the first trough section 16. The hopper 96 comprises an elongated receiving portion 130, while the first trough section 16 comprises opposed trough openings 132. The hopper assembly 12 comprises a rod 134 that configured to pass across the receiving portion 130 and the trough openings 132 to allow for pivotable rotation of the hopper 96 with respect to the first trough section 16 from approximately 0° to approximately 90° (as shown in FIG. 26). Referring to FIGS. 25 and 27, the hopper 96 comprises one or more outward-extending tips 136. The first trough section 16 may comprise one or more stops 138 that are configured to engage with the tips 136 when the hopper 96 has reached its maximum rotational angle with respect to the first trough section 16. The engagement of the tips 136 with the stops 138 prevents excessive rotation of the hopper 96 with respect to the first trough section 16, which could cause the hopper 96 to tip over. The rod 134 may be removably detached so as to separate the hopper assembly 12 from the trough assembly 14.

Referring to FIG. 1, the hopper assembly 12 may further comprise a hopper fin 144 extending from the underside of the hopper 96 proximate to the window 124. The hopper fin 144 comprises one or more notches 146 that are configured for attachment to a damper (not shown) for flattening or reducing the turbulence of the water (and placer deposit) exiting the window 124.

Figure 28:
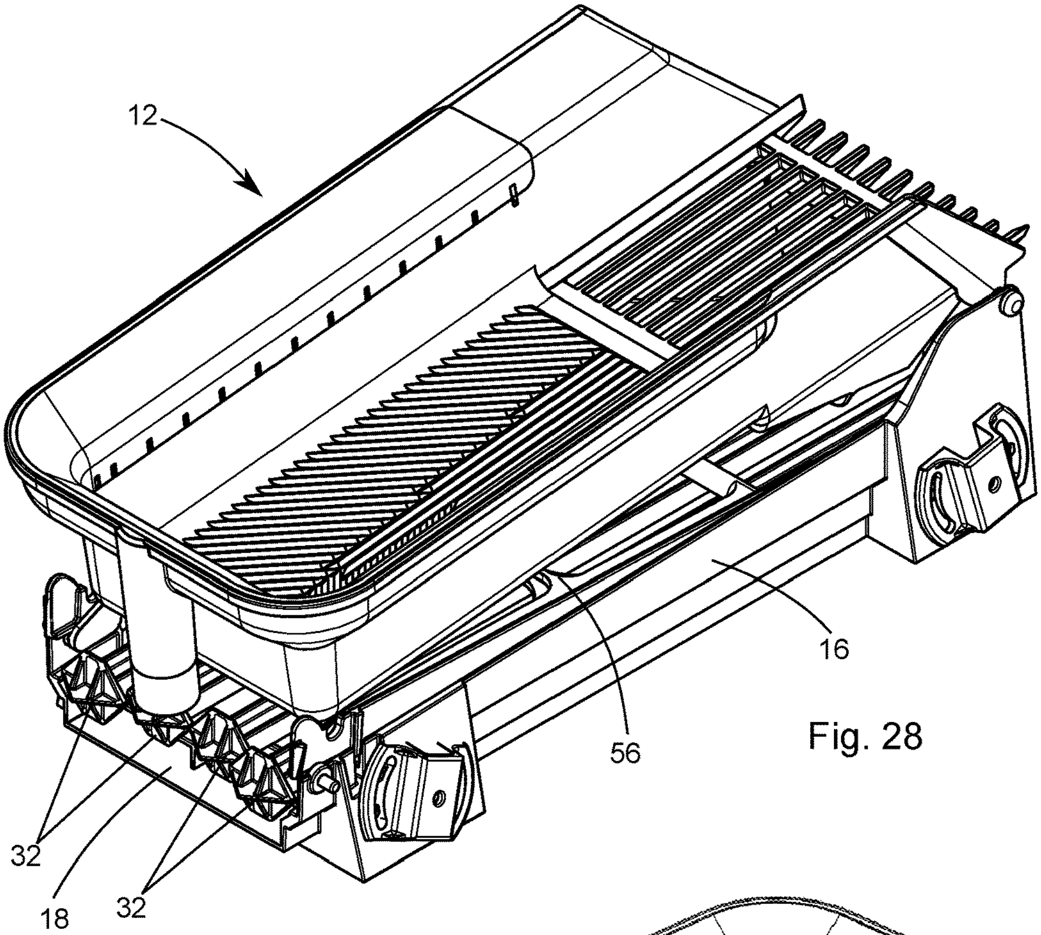
FIG. 28 is a top perspective view of the highbanker in a nested configuration.
Figure 29:
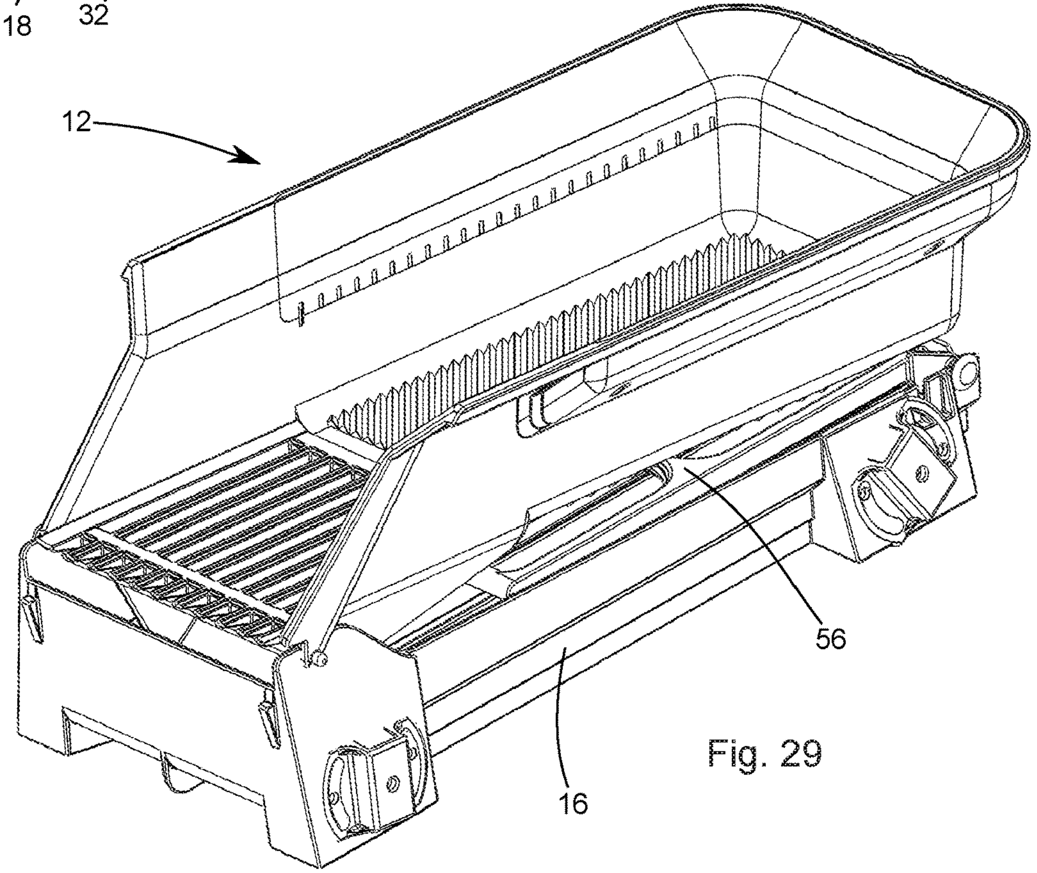
FIG. 29 is another top perspective view of the highbanker in a nested configuration.

Referring to FIGS. 28 to 31, the components of the highbanker 10 may be collapsed and nested from an assembled configuration (as shown, for example, in FIG. 1) into a nested configuration shown in FIGS. 28 to 31. The second trough section 18 may be nested within the first trough section 16, as described above. In addition, the brace member 56 may be placed on top of the second trough section 18, also as described above. The hopper assembly 12 may be pivoted towards the first trough section 16 until it is substantially resting on the first trough section 16. The legs 32 may be detached from the first trough section 16 and stored within the (nested) second trough section 18, as shown in FIG. 28. In the nested configuration, the highbanker 10 is in a much more compact form for storage or transport.

Assembly and disassembly of the highbanker 10 will now be described. In order to assemble the highbanker 10 into the assembled configuration shown in FIG. 1, the legs 32 are attached to the first trough section 16 using the brackets 34. The height and angle of the first surface 20 may be set by selecting where along the legs 32 the brackets 34 are used to secure the legs 32 to the attachment surfaces 36. In addition, the angle of the first surface 20 may also be set by selecting the rotational angle of the brackets 34. Once the legs 32 are secured to the first trough section 16, the second trough section 18 may be connected to the first trough section 16. The hopper assembly 12 may also be connected to the first trough section 16 by inserting the rod 134 through the hopper openings 130 and the trough openings 132. The brace member 56 can then be attached to the trough assembly 14 by inserting the first pin portion 90 into the first wall openings 84 and by resting the second pin portion 92 on the grooves 82. The angle of the hopper assembly 12 with respect to the trough assembly 14 can then be set by inserting the brace end 58 in between the appropriate adjacent ones of the ridges 64. The highbanker 10 should be substantially in the configuration shown in FIG. 1 (i.e. the assembled configuration). An appropriate water supply can be connected to the water intake 108. Sluice mats 27, if needed, can then be placed on the first and second surfaces 20, 24. The highbanker 10 can now be used by introducing placer deposit onto the intake surface 104.

In order to disassemble the highbanker 10 from the assembled configuration shown in FIG. 1 to the nested configuration shown in FIG. 28, the hopper assembly 12 may be lifted until the brace end 58 is no longer in between the ridges 64. The brace arms 60 may be detached from the trough assembly 14 by deflecting the brace arms 60 inward until the first pin portions 90 have passed out of the first wall openings 84. The second trough section 18 can then be detached from the first trough section 16, rotated laterally 180°, and nested within the first trough section 16. The brace member 56 can then be laid on top of the second trough section 18 and secured to the first trough section 16. The hopper assembly 12 can be allowed to rest upon the nested second trough section 18. The legs 32 may be removed from the first trough section 16 and placed within the second trough section 18, resulting in the fully disassembled and nested configuration shown in FIG. 28.

Figure 30:
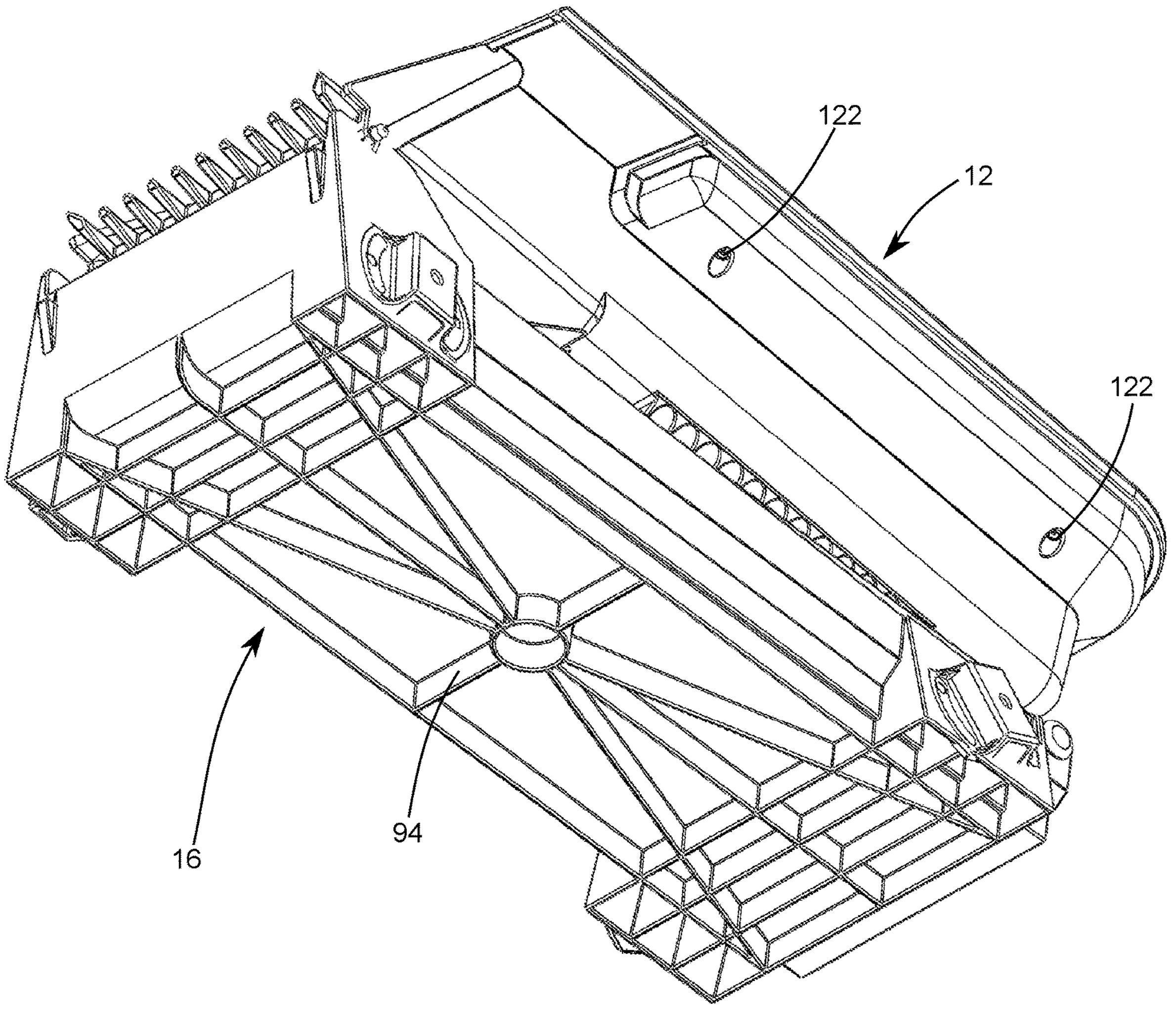
FIG. 30 is a bottom perspective view of the highbanker in a nested configuration.
Figure 31:
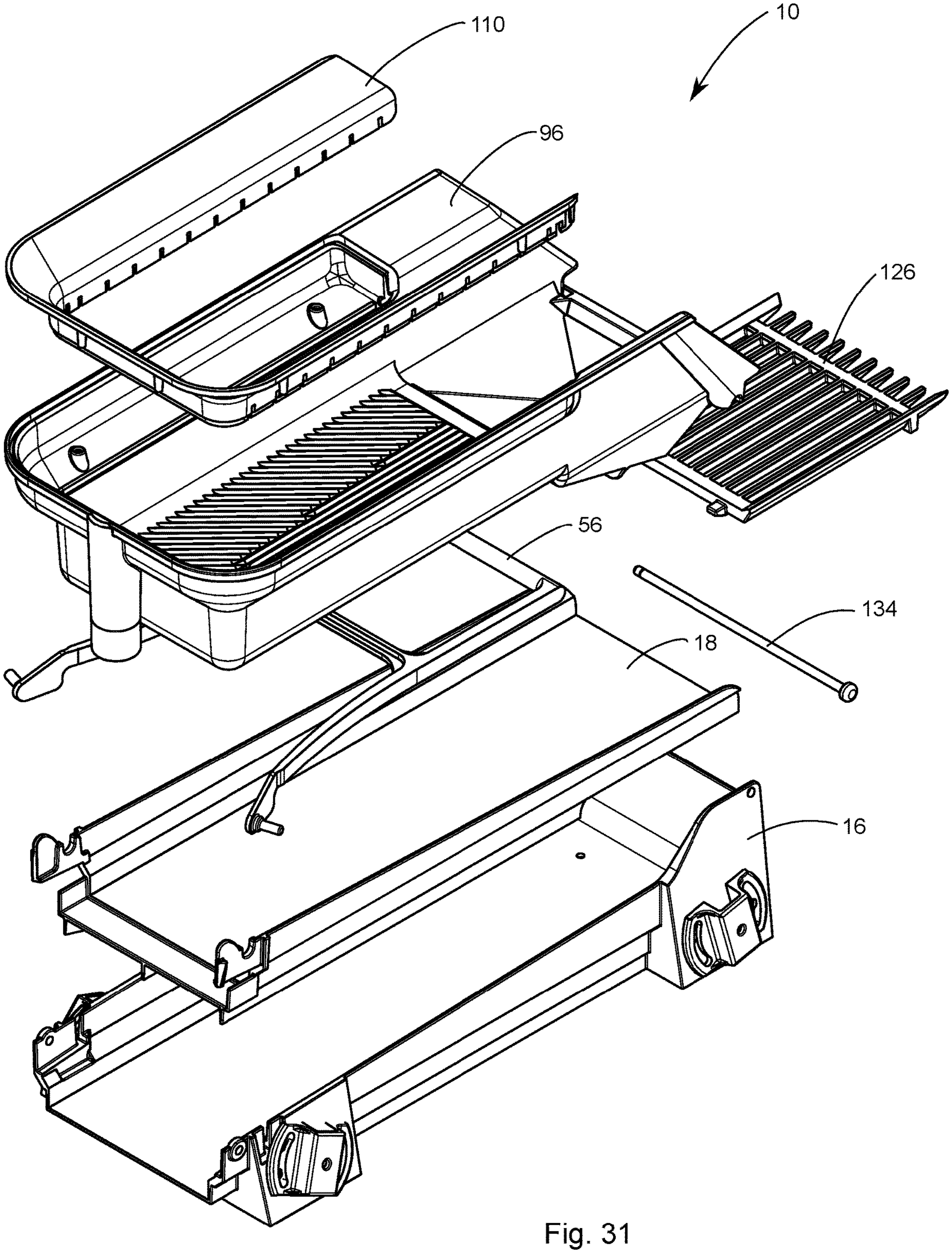
FIG. 31 is an exploded view of the highbanker in a nested configuration.

Referring to FIGS. 13 and 30, one or both of the first and second trough sections 16, 18 may comprise ribs 94. The ribs 94 may be formed on a side of one or both of the first surface 20 and the second surface 24. For example, FIG. 13 shows the ribs 94 formed on an underside of the second surfaces 24, while FIG. 30 shows the ribs 94 formed on an underside of the first surface 20. The ribs 60 provide additional strength and rigidity to the trough assembly 14.

One or more of the first and second trough sections 16, 18, the legs 32, the brace member 56, the hopper 96, and the cover 110 may be formed from injection-moulded plastic.

It will be appreciated by those skilled in the art that the preferred embodiment has been described in some detail but that certain modifications may be practiced without departing from the principles of the invention.

The invention claimed is:

1. A hopper assembly for accepting placer deposit and water for use with a highbanker, the hopper assembly comprising:

a hopper comprising:

an intake surface for accepting the placer deposit;

a hopper periphery portion extending along at least three sides of the hopper;

a water intake configured to accept water, the water intake located within the hopper periphery portion; and a window configured to receive the placer deposit and water from the intake surface and to allow the placer deposit and water to exit from the hopper; and a cover comprising:

a cover surface configured to fit over the hopper periphery portion; and a plurality of cover openings formed on the cover surface;

wherein the cover surface and the hopper periphery portion define, at least in part, a hollow within which water from the water intake flows, the hollow extending along the at least three sides of the hopper; and wherein the cover openings are configured to allow for water to exit the hollow and contact the placer deposit on the intake surface.

2. The hopper assembly of claim 1, wherein the cover openings are configured to allow for streams of water to exit the hollow and contact the placer deposit on the intake surface.

3. The hopper assembly of claim 1, wherein the hopper periphery portion is located on an upper periphery of the hopper.

4. The hopper assembly of claim 1 further comprising a screen removably attachable over the window.

5. The hopper assembly of claim 4, wherein the screen comprises a plurality of screen openings for allowing particular sizes and shapes of placer deposit to pass through the screen.

6. The hopper assembly of claim 1, wherein the intake surface comprises an angled contour surface adapted to direct the placer deposit and water towards a middle of the intake surface.

* * * * *